(No Model.)  2 Sheets—Sheet 2.
J. L. CHASE.
FOG WHISTLE MACHINE.
No. 358,648. Patented Mar. 1, 1887.
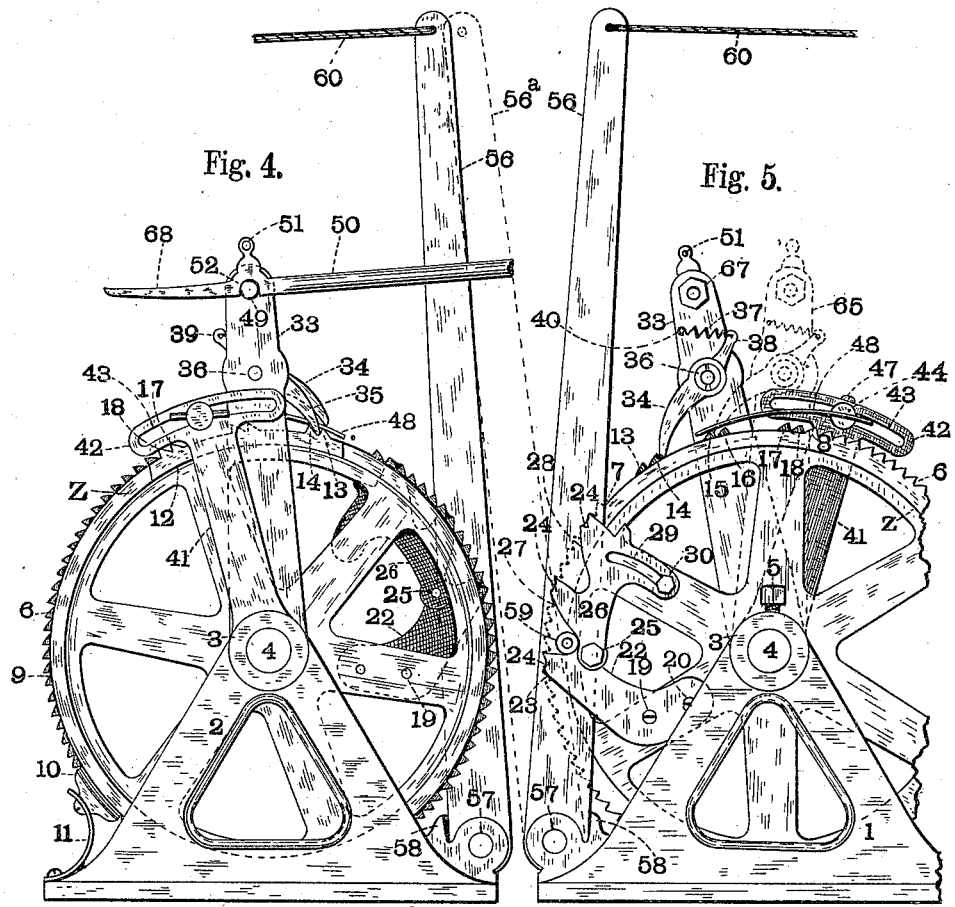
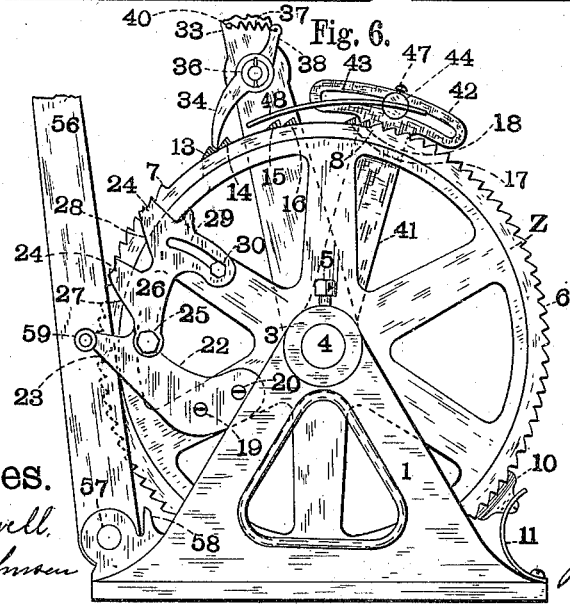
Witnesses.
Jennie M. Caldwell.
Mrs. J. G. Johnson.
Inventor.
James L. Chase
By James Sangster
Atty.

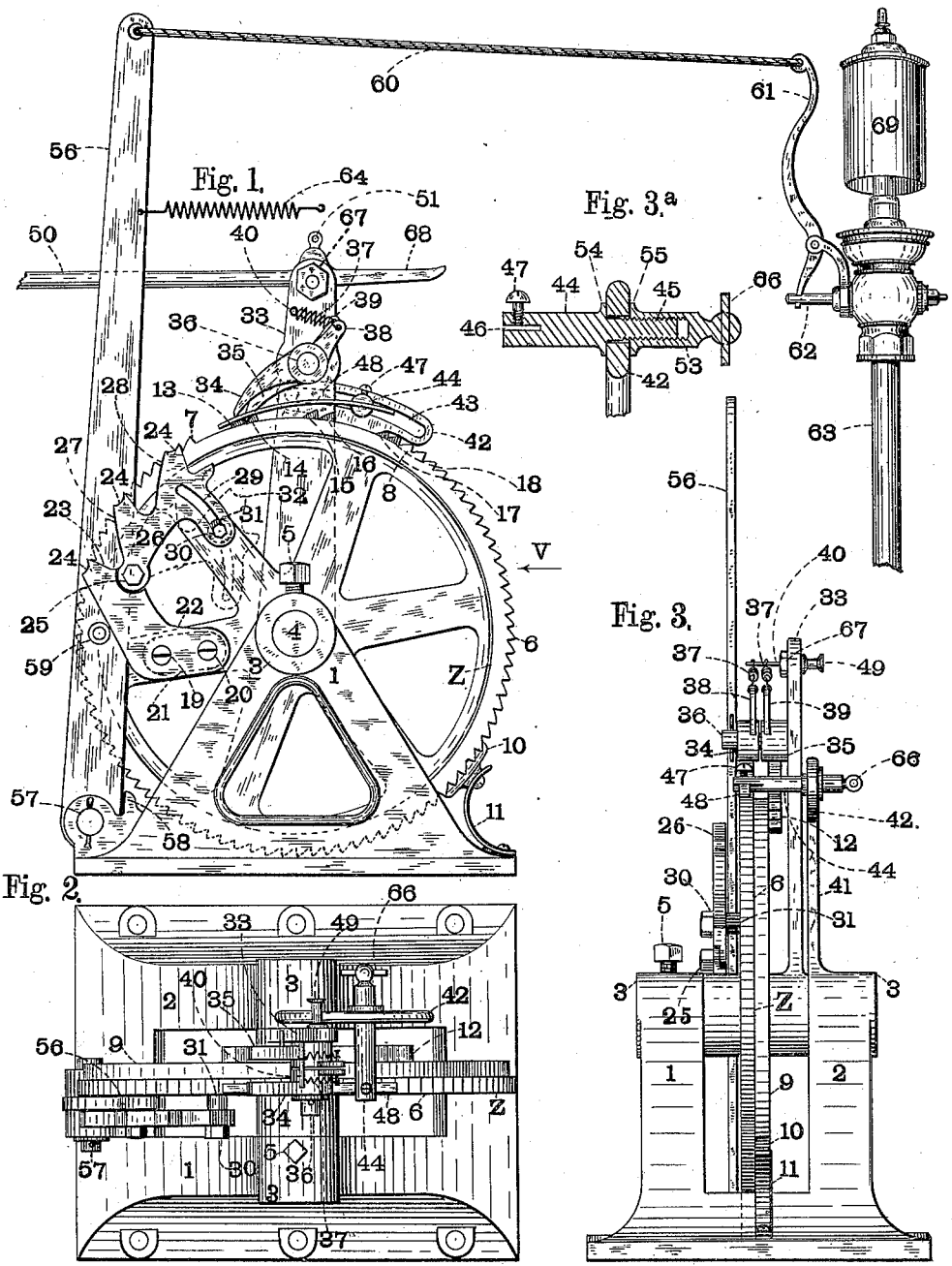

UNITED STATES PATENT OFFICE.

JAMES L. CHASE, OF CLEVELAND, OHIO, ASSIGNOR TO THE CHASE FOG WHISTLE MACHINE COMPANY, OF SAME PLACE.

FOG-WHISTLE MACHINE.

SPECIFICATION forming part of Letters Patent No. 358,648, dated March 1, 1887.

Application filed April 19, 1886. Serial No. 199,374. (No model.)

*To all whom it may concern:*

Be it known that I, JAMES L. CHASE, a citizen of the United States, residing at Cleveland, in the county of Cuyahoga and State of Ohio, have invented certain new and useful Improvements in Fog-Whistle Machines, of which the following is a specification.

The object of my invention is to provide an automatic machine for blowing a fog-whistle at such intervals as may be required, all of which will be fully and clearly hereinafter described, shown, and claimed by reference to the accompanying drawings, in which—

Figure 1 is a side elevation showing the machine complete and connected by a cord to a steam-whistle. Fig. 2 is a plan or top view. Fig. 3 is a back elevation of the machine, looking in the direction of the arrow V, Fig. 1. Fig. 3$^a$ is a central longitudinal section through a movable adjusting-pin, which will be more clearly hereinafter described, also a section through a portion of its supporting-arm. Fig. 4 is a side elevation showing the side of the machine opposite to that shown in Fig. 1. Fig. 5 is a side elevation showing the position of the arm for operating the whistle just after an alarm has been given, and Fig. 6 is a side elevation showing the position of the parts just as an alarm is being sounded.

The frame of the machine is preferably made in one piece of cast-iron, and consists of the two sides 1 and 2, each of which is provided with bearings 3 to receive the shaft 4. This shaft 4 is rigidly secured to the frame by a set-screw, 5. Between the two sides of the frame, mounted so as to turn on the shaft 4, is a wheel, Z, having a series of teeth, 6, and a blank space from 7 to 8. On one side of the teeth is a smooth periphery, 9, (see Figs. 2, 3, and 4,) having a brake, 10, kept up against it by a spring, 11, with sufficient force to hold the wheel at any point to which it may be moved. Directly opposite the blank space, from 7 to 8, is a short segment or portion of a circle, 12. (Shown more clearly in Figs. 2, 3, and 4.) It is made either in one piece with the wheel Z, or rigidly secured to it in any well-known way, and is provided with six teeth arranged in three pairs, 13 and 14, 15 and 16, and 17 and 18. At the opposite side of the wheel Z is rigidly secured, by bolts or screws 19 and 20, on a stud, 21, (shown by the dotted lines in Fig. 1 projecting from an arm of the wheel,) an angular piece, 22, having one large tooth, 23, provided with a hollow space, 24, at the top. To this angular piece 22 is pivoted, by a pin or bolt, 25, another piece, 26, having two teeth, 27 and 28, of the same shape and size as that shown at 23, each having a hollow space, 24, at the top. I have shown these teeth 23, 27, and 28 in the form of an ordinary inclined tooth having the hollow or depressed face 24, and having its front side inclined back from its direction of movement sufficiently to enable it to work easily against the roller 59, and its back side made to incline sufficiently in nearly the same direction, so as to permit the roller 59 to move freely, without obstruction, into the position shown in Fig. 5; but the inclined faces of these teeth may be varied somewhat without changing the nature of the invention. At the upper portion of this pivoted piece 26 is a slot, 29, the curve of which forms a part of a circle having for its center the pin or bolt 25.

30 represents a bolt, which passes through this slot into a stud, 31. (Shown in Figs. 1, 2, and 3.) The object of this pivoted piece is to permit of the single tooth 23 only being in action when required by swinging the pivoted piece 26 back into the position shown by the dotted lines 32 in Fig. 1, in which position it is secured by the bolt 30, which is used to hold it at any point it may be adjusted to.

An arm, 33, pivoted by the shaft 4, passing through it, is arranged alongside of the toothed wheel Z, and provided with two independently-acting pawls, 34 and 35, both pivoted on the same pin, 36. Each pawl is provided with a spring, 37, secured to the parts 38 and 39 and to a pin, 40, on arm 33, to adapt the points of the pawls to spring down to and engage with the teeth in the wheel. An equivalent for the same would be their own weight.

The thickness of the arm 33 and its hub, and the wheel and its hub, fill the space between the two sides of the frame 1 and 2, and both are loosely fitted to the shaft 4, so as to turn thereon. At the top of this arm 33 is a flanged pin, 49, secured thereto by a nut, 67. It is adapted to receive the hooked connecting-bar 50. This bar is more plainly shown in Fig. 4. The connecting-bar 50 is pivoted to any convenient part of a steam-engine having a movement coincident with that of the crank, so that every time the engine makes one revolution it will move the arm 33 once back and forth, as shown in Fig. 5, where the arm is shown at the limit of its forward movement, and the limit of its back movement is shown by dotted lines 65.

A cord or small rope is connected to the bar 50 by the eye 51, and with the pilot-house in any well-known way within easy reach of the captain, so that he can at any time set it in gear by letting the hook portion 52 of the bar 50 drop over the pin 49, as shown in said Fig. 4, or lift it up out of gear.

68 is the usual straight, or nearly straight, portion at the end of the hook. The use of this portion 68 (as is well known) is to allow the hook or hook portion to be dropped at any time onto the pin 49, and in case the hook should not be in position to immediately catch onto the pin, it would (instead of dropping by it) be supported by the part 68 until the movement of the rod 50 should bring the hook part 52 directly over the pin 49, when it would drop in place and engage with the pin, so as to set the fog-machine in motion; but as the rod 50 and its connections are old and well known for the purpose of connecting or disconnecting with a pin, as above mentioned, and as some of the connecting parts would have to be changed to suit the varying construction and arrangements in different boats, a further description here is not required.

To the side 2 of the frame is rigidly secured or cast in one piece with it an arm, 41, having at its upper end a curved piece, 42, provided with a curved slot, 43, the curve of which is a portion of a circle having a center coinciding with the center of the shaft 4. In this curved slot 43 is an adjusting-pin, 44. It is more clearly shown in the enlarged section, Fig. 3ª, and consists of the portion 44, having a reduced screw portion, 45, at the rear end, and at the front portion is a slot, 46, and a set-screw, 47. This slot 46 and set-screw are adapted to hold the curved metallic slip 48 rigidly to the pin 44. On the rear portion of the pin is a screw-sleeve, 53, adapted to screw onto the portion 45, and is provided with a thumb-piece, 66, for turning it. (See Fig. 3ª.) This construction permits the screw portion 45 to be put through the slot 43 on the part 42 until stopped by the shoulder 54. The sleeve now being put on, it will be seen that it may be screwed up, and the two shoulders 54 and 55 will serve to clamp it tightly to the slotted portion of the arm 41, and it will be further seen that it may be adjusted at any point in said slot. The object of this construction is to permit the curved plate or slip 48 to be adjusted longitudinally, so as to more or less cover the teeth 6 in the wheel, and thereby permit the pawl 34 to take either one tooth, 6, at each revolution of the engine, or more, as may be desired.

56 represents the arm for operating the fog-whistle. It is pivoted by a bolt, 57, to the base of the machine, and is prevented from moving forward too far by a piece, 58, projecting from the base of the machine. On this arm is a friction-roller, 59, and at the top is connected a cord, 60, for connecting it with any well-known steam-whistle arm 61 (see Fig. 1) or fog-whistle for operating the valve-stem 62, the pipe 63 being connected in any well-known way to a steam-boiler. I have shown a well-known steam-whistle, 69, in the drawings, Fig. 1; but any other kind of fog whistle or alarm may be used.

The arm 56 is kept forward toward the teeth 23 27 28 by means of a spring, 64, which is connected to the arm at one end, as shown, and the other end may be connected to any stationary part of the mechanism or to any part of the boat, or any other well-known device adapted for the purpose may be used.

In these drawings I have shown seventy-nine teeth 6 in the wheel Z, leaving a blank space from 7 to 8. The curved piece 12 nearly fills this space from 7 to 8, and the teeth upon it are placed the same distance apart—that is, the teeth 13, 15, and 17 are the same distance from each other that the points 24 of the teeth 23, 27, and 28 are, and the arm 33 is made to move back and forth the distance of four of the teeth 6, and therefore the points of the pawl 25 would move, for instance, from its position against the tooth 14 to the tooth 15, as shown by the dotted lines. Now the result of this action is that when the pawl 35 has made the limit of its movement forward against the tooth 13, for instance, the limit of its backward movement will carry it not past the point of the tooth 15, but nearly up to it, so that in its next full forward movement it will touch nothing until it reaches the tooth 14 and will carry that tooth forward a distance equal to one of the teeth 6, or equal to the distance of the teeth 13 and 14 or 15 and 16 apart, so that when the pawl 34 within the space from 7 to 8 is idle the pawl 35 is moving the wheel Z forward, as above mentioned.

The operation of the machine is as follows: The curved piece 48 is adjusted, for instance, so that the pawl 34 as it moves forward can only take one tooth 6 and move it one tooth forward, so that in starting with the tooth at the point 8 it would take seventy-nine reciprocating movements of the arm 33 (or that number of revolutions of the engine) to bring the teeth 23, 27, and 28 into the position shown in Fig. 1. The pawl 34 is now idle, as it is moving back and forth over a portion of the curved plate 48 and over the smooth space from 7 to 8. The pawl 35 now comes into action, and at the limit of the backward movement of the arm 33 its point drops in between teeth 13 and 14, (see Fig. 1,) so that its next forward movement will move the wheel Z the distance of four of the teeth 6 forward, or far enough to move the large tooth 23, so that the friction-roller 59 on the arm 56 will rest in its hollow point 24, as shown in Fig. 6. This action, as will be readily seen, opens the fog-whistle valve and causes the whistle to sound as long as it remains in that position. The next backward movement of the arm 33 brings the point of the pawl 35 past the tooth 14 and up to but not past the tooth 15, and when it again makes a forward movement and is about the length of one of the teeth 13 or 14 from the limit of such movement, it engages with the tooth 14 and moves it the distance of one of the teeth 6 forward, or far enough to cause the point of the large tooth 23 to move past the friction-roller and allow the spring 64 to quickly pull the arm 56 forward, so that the friction-roller rests between the large teeth 23 and 27, as shown in Fig. 5, which instantly shuts off the steam by closing the whistle-valve and thereby stopping the sound. This operation is repeated with the large teeth 27 and 28 and the remaining pairs of teeth 15 and 16, 17 and 18, so that the whistle is blown three times in succession. The toothed wheel Z has now made a complete revolution and is again in position, so that the pawl 34 comes into action and takes the first of the teeth 6 at the point 8 and moves them one tooth at each forward movement, as before mentioned.

As hereinbefore stated, when it is required to blow but one whistle every minute, all that is necessary to do is to swing the two teeth 27 28 back out of the way, (or the part 26,) and fasten them by the set-screw 30 in the position shown by the dotted lines 32 in Fig. 1. The operation of the pawl 35 on the teeth 13 and 14, 15 and 16, and 17 and 18 will be precisely the same; but the whistle will be sounded only once during each minute or during the time the toothed wheel is making one revolution.

I do not confine myself to the exact number of the teeth 6 on the wheel Z, as shown, as they may be varied. For instance, if there should be double the number (which would make them half the size for the same space or same size wheel) then the slip 48 could be adjusted to take two of such teeth; but one thing is arbitrary, the distance between the points 24 of the teeth 23, 27, and 28 should be equal to the distance between the teeth 13 and 15 or 16 and 18, and the teeth on the part 12 should be arranged in pairs 13 and 14, 15 and 16, and 17 and 18. A further object of the adjustable curved strip 48 is to provide the means for adjusting the machine to the speed of different engines. If the engine should run very slow, then it should be adjustable, so that the pawl 34 will take more teeth, or, if too fast, it may be adjusted to take a less number of teeth.

It will be further seen that if it be desired to have the machine constructed so as to have the signals or alarms given during shorter intervals of times than above provided for all that is required to do is to decrease the number of the teeth 6 on the wheel Z, which will proportionately increase the length of the blank space from 7 to 8. The distance between the teeth 13 and 15 or 15 and 17 would also have to be increased in the same proportion, and the distance between the parts 24 of the large teeth 23, 27, and 28 should be increased to correspond, and in some cases the curved plate 48 may be left off or dispensed with; but these changes would not in any way alter the nature or principle of my invention, or in the least affect or change its action or mode of operation.

If desired, the brake 10 may be applied to the side of the wheel Z, and kept up to it by a spring, in which case the smooth periphery 9 could be dispensed with; and, further, if the wheel Z should be closely fitted to the shaft 4, or if a spring should be introduced between the side of the frame and the hub of the wheel, the brake 10 could then be dispensed with, the object being to fit the wheel so that it cannot be moved easily except by the pawls 34 or 35, and if the brake is thus dispensed with the three pairs of teeth 13 and 14, 15 and 16, and 17 and 18 could be placed opposite the blank space 7 to 8, in their same relative positions upon the smooth periphery 9, and the pawl 35 brought closer to the pawl 34. This construction would be an equivalent to the construction above described, and the invention and its mode of operation would be exactly the same.

If the machine is used when it is only required to blow but one whistle at certain intervals of time, the pivoted piece 26 may then be left off entirely, or where it is required to continuously blow three whistles during certain intervals of time then all three teeth, 23, 27, and 28, may be formed in one piece and all rigidly secured to the wheel Z.

I claim as my invention—

1. In a fog-whistle machine, the frame having a shaft, 4, rigidly secured thereto, a toothed wheel, Z, mounted so as to turn on said shaft, and provided with a blank space having opposite to it a series of pairs of teeth, 13 and 14, 15 and 16, 17 and 18, and on one side a large tooth, 23, rigidly secured to said wheel, a pivoted arm provided with a friction-roller, 59, a spring, 64, and a cord or other similar means for connecting with a fog-whistle, and an arm, 33, provided with pawls 34 and 35 for operating the machine and blowing one whistle at certain intervals of time, substantially as described.

2. In a fog-whistle machine, a suitable frame having a shaft upon which is mounted a toothed wheel, Z, provided with a blank space, and opposite or to one side of said space a series of double teeth, as set forth, and having secured to the side of said wheel a large tooth, 23, provided with a flat or hollow end, 24, and pivoted to it a swinging plate, 26, having two similar teeth, 27 and 28, and a slot and nut for securing it, in combination with an arm provided with pawls 34 and 35 for operating the wheel, and an arm, 56, pivoted at its lower end to the frame and provided with a pin or friction-roller, 59, a spring for causing its return movement and a cord for connecting it with the arm for operating the whistle, substantially as specified, whereby either one or three whistles may be sounded during certain intervals of time, as described.

3. In a fog-whistle machine, a suitable frame, a wheel mounted on said frame and provided with a continuous series of teeth, 6, of a uniform distance apart and partly surrounding the periphery, thereby leaving a blank space between the ends of said series of teeth, and opposite or to one side of the blank space a series of teeth, arranged in pairs and located a greater distance apart, and a series of larger teeth on the opposite side of the wheel, having their ends at the same distance apart, in combination with a vibrating arm having pawls 34 and 35, the pawl 34 being adapted to operate on the series of teeth 6, and the pawl 35 being adapted to move only the teeth opposite the blank space, whereby the pawl 34 partly completes the revolution of the wheel and becomes idle, while the pawl 35 engages with the teeth opposite the blank space and completes the revolution, and one or more teeth, 23, and an arm, 56, pivoted to the frame and having a friction-roller, 59, a means for causing its return movement, and a cord for connecting it with the arm 61, for operating a fog-whistle, substantially as described.

4. In a fog-whistle machine, the combination of the frame, a wheel, Z, having a series of teeth, 6, a blank space, 7 to 8, a curved piece, 12, on the outer side of said wheel Z, having a series of pairs of teeth, 13 and 14, 15 and 16, 17 and 18, and at the front or opposite side a series of large teeth, 23, 27, and 28, a rigidly-fixed arm, 41, carrying and supporting an adjustable plate, 48, made adjustable by means of the slot 43, the pin 44, and a screw sleeve or nut, a swinging arm, 33, pivoted to the shaft 4, and provided with pawls 34 35, kept in their position by springs, a pivoted arm, 56, having a friction-wheel, 59, and a spring for causing its quick return after being forced out and released by the large teeth 23, 27, or 28, a suitable cable, 60, for connecting with a fog-whistle, substantially as specified, and a brake for holding the wheel until moved by the pawls, the whole combined for joint operation, as and for the purposes described.

JAMES L. CHASE.

Witnesses:
JAMES SANGSTER,
JENNIE M. CALDWELL.